US006364351B1

(12) United States Patent
Hier et al.

(10) Patent No.: US 6,364,351 B1
(45) Date of Patent: Apr. 2, 2002

(54) VEHICLE AIR BAG RESTRAINT ASSEMBLY

(75) Inventors: Michael J. Hier, Royal Oak; Joseph J. Davis, Jr., Ortonville, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/589,726

(22) Filed: Jun. 8, 2000

(51) Int. Cl.⁷ .............................................. B60R 21/16
(52) U.S. Cl. .................................... 280/732; 280/743.2
(58) Field of Search ............................. 280/732, 743.1, 280/743.2, 728.3

(56) References Cited

U.S. PATENT DOCUMENTS

| | | | |
|---|---|---|---|
| 3,778,085 A | * 12/1973 | Lipkin ..................... | 280/728.3 |
| 5,242,192 A | 9/1993 | Prescaro et al. | |
| 5,303,951 A | 4/1994 | Goestenkors et al. | |
| 5,326,131 A | 7/1994 | Yokota et al. | |
| 5,326,132 A | 7/1994 | Musiol et al. | |
| 5,342,085 A | 8/1994 | Hirashima et al. | |
| 5,398,960 A | 3/1995 | Ravenberg et al. | |
| 5,429,385 A | 7/1995 | Kamiji et al. | |
| 5,447,327 A | * 9/1995 | Jarboe et al. ............ | 280/728.3 |
| 5,449,196 A | 9/1995 | Ohno et al. | |
| 5,458,361 A | * 10/1995 | Gajewski ................. | 280/728.3 |
| 5,482,313 A | 1/1996 | Ikeya et al. | |
| 5,553,887 A | 9/1996 | Karlow et al. | |
| 5,651,562 A | * 7/1997 | Hagen et al. ............ | 280/728.3 |
| 5,794,967 A | 8/1998 | Manire | |
| 5,803,490 A | 9/1998 | Seventko et al. | |
| 5,839,752 A | 11/1998 | Yamasaki et al. | |
| 5,887,891 A | 3/1999 | Taquchi et al. | |
| 5,941,558 A | * 8/1999 | Labrie et al. ............ | 280/728.3 |
| 6,089,642 A | * 7/2000 | Davis, Jr. et al. ............ | 296/70 |
| 6,189,916 B1 | * 2/2001 | Bowers et al. ........... | 280/728.3 |

* cited by examiner

Primary Examiner—Paul N. Dickson
Assistant Examiner—Faye M. Fleming
(74) Attorney, Agent, or Firm—Brooks & Kushman P.C.

(57) ABSTRACT

A vehicle air bag restraint assembly having an instrument panel (12) with a breakaway door (16) includes an air bag housing (20, 22) mounted on a cross beam (54) and also having an air bag (24) having an inflator (26) with a threaded connection (28) to the housing. A flexible member (34) has a securement portion (36) secured to the housing by the connection (28) of the air bag inflator (26).

9 Claims, 4 Drawing Sheets

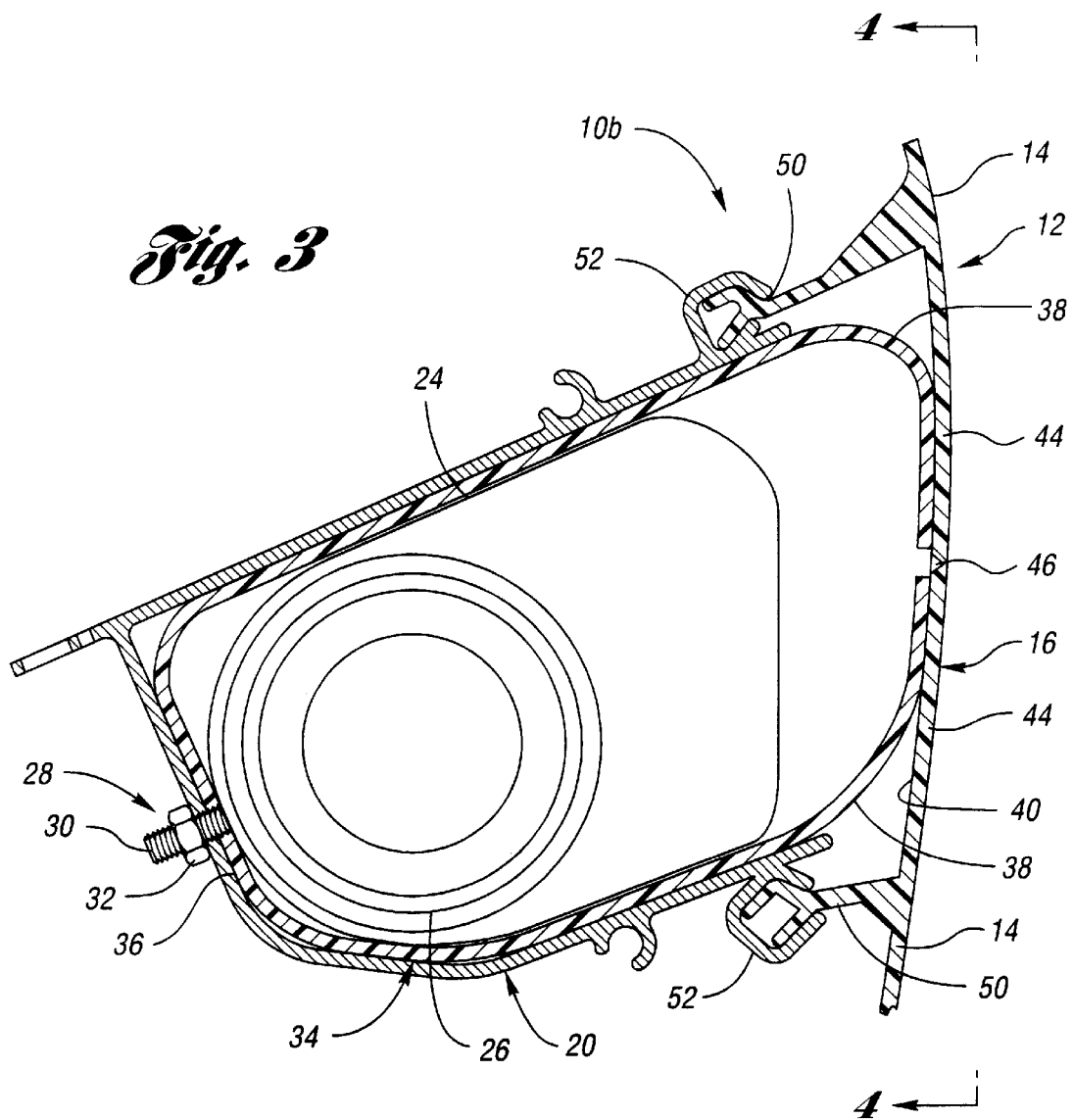

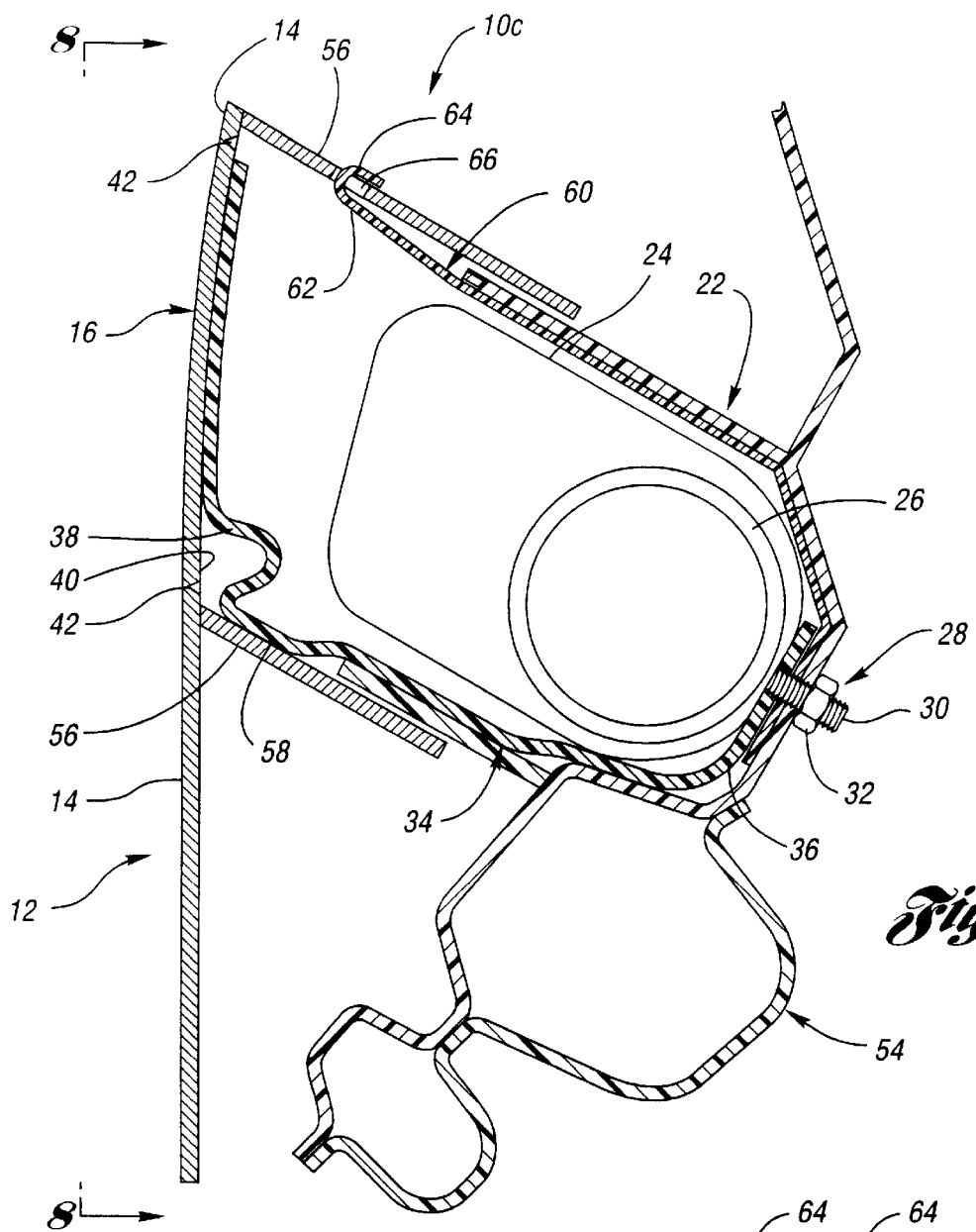
Fig. 6
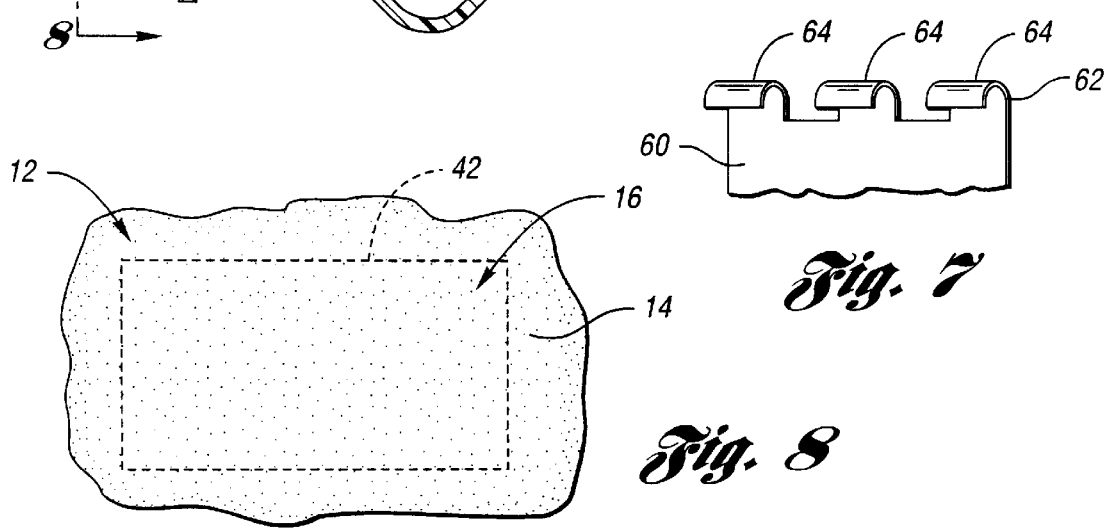
Fig. 7
Fig. 8

US 6,364,351 B1

VEHICLE AIR BAG RESTRAINT ASSEMBLY

TECHNICAL FIELD

This invention relates to an air bag restraint assembly for use in a vehicle.

BACKGROUND ART

Vehicles have previously included inflatable air bags for providing occupant restraint during abrupt acceleration or deceleration such as during an impact with another vehicle or a fixed object.

Prior vehicle air bag restraint assemblies noted by an investigation conducted in connection with the present invention are disclosed by U.S. Pat. No. 5,242,192 Prescaro et al.; U.S. Pat. No. 5,303,951 Goestenkors et al.; U.S. Pat. No. 5,326,131 Yokota et al.; U.S. Pat. No. 5,326,132 Musiol et al.; U.S. Pat. No. 5,342,085 Hirashima et al.; U.S. Pat. No. 5,398,960 Ravenberg et al.; U.S. Pat. No. 5,429,385 Kamiji et al.; U.S. Pat. No. 5,449,196 Ohno et al.; U.S. Pat. No. 5,482,313 Ikeya et al.; U.S. Pat. No. 5,794,967 Manire; U.S. Pat. No. 5,553,887 Karlow et al.; U.S. Pat. No. 5,803,490 Seventko et al.; U.S. Pat. No. 5,839,752 Yamasaki et al.; and U.S. Pat. No. 5,887,891 Taquchi et al.

DISCLOSURE OF INVENTION

An object of the present invention is to provide an improved vehicle air bag restraint assembly.

In carrying out the above object, the vehicle air bag restraint assembly of the invention includes a vehicle instrument panel having a support portion, a breakaway air bag door mounted by the support portion, and a housing extension. A vehicle cross beam of the assembly includes an air bag housing to which the housing extension of the instrument panel extends, and an air bag is mounted within the housing and includes an inflator having a threaded connection to the housing. A flexible member of the restraint assembly has a securement portion that is secured to the housing by the threaded connection of the inflator. This flexible member has an intermediate portion that is secured to the housing extension of the instrument panel, and the flexible member has a tether portion that extends to and is secured to the air bag door of the vehicle instrument panel to tether the air bag door when it breaks away from the support portion of the instrument panel upon inflation of the air bag.

In one construction, the instrument panel has a hidden surface including a rectangular break line that defines the breakaway air bag door with a rectangular shape.

In another construction, the breakaway air bag door includes a pair of door portions, with the flexible member having a pair of intermediate portions that are secured to the housing extension of the instrument panel and also having a pair of tether portions that respectively extend to and are secured to the pair of door portions of the door, and with the air bag being located between the pair of tether portions. The pair of tether portions are preferably unitary with each other.

The instrument panel in one construction has a hidden surface that includes an H-shaped break line that defines the pair of door portions, while another construction has the instrument panel provided with a hidden surface that includes a rectangular break line with a central dividing break line that cooperatively define the pair of door portions.

In certain embodiments of the vehicle air bag restraint assembly, the vehicle instrument panel and the air bag housing have fastening portions that provide securement thereof to each other.

A connector extends between the housing extension of the instrument panel and the threaded connection of the air bag inflator to the housing of the cross beam. The connector is embodied by a bracket having a hooked end connected to the housing extension of the instrument panel.

The object, features and advantages of the present invention are readily apparent from the following detailed description of the best mode for carrying out the invention when taken in connection with the accompanying drawings.

BRIEF DESCRIPTION OF DRAWINGS

FIG. 3 is a sectional view similar to similar to FIG. 1 but illustrating another embodiment where the breakaway door of the instrument panel has a pair of door portions.

FIG. 4 is a view taken along the direction of line 4—4 in FIG. 3 illustrating the H-shaped construction of a breakaway line that defines the pair of door portions.

FIG. 5 is a view similar to FIG. 4 illustrating breakaway lines of a rectangular shape with a central dividing line to provide the pair of door portions.

FIG. 6 is a sectional view of an embodiment of a vehicle air bag restraint assembly constructed in accordance with the invention.

FIG. 7 is a perspective view illustrating a hooked connector of the restraint assembly embodiment shown in FIG. 6.

FIG. 8 is a view of the vehicle instrument panel taken along the direction of line 8—8 in FIG. 6 to show the rectangular shape of a hidden breakaway line that defines the door that breaks away when the air bag is inflated.

BEST MODE FOR CARRYING OUT THE INVENTION

Figure 9:
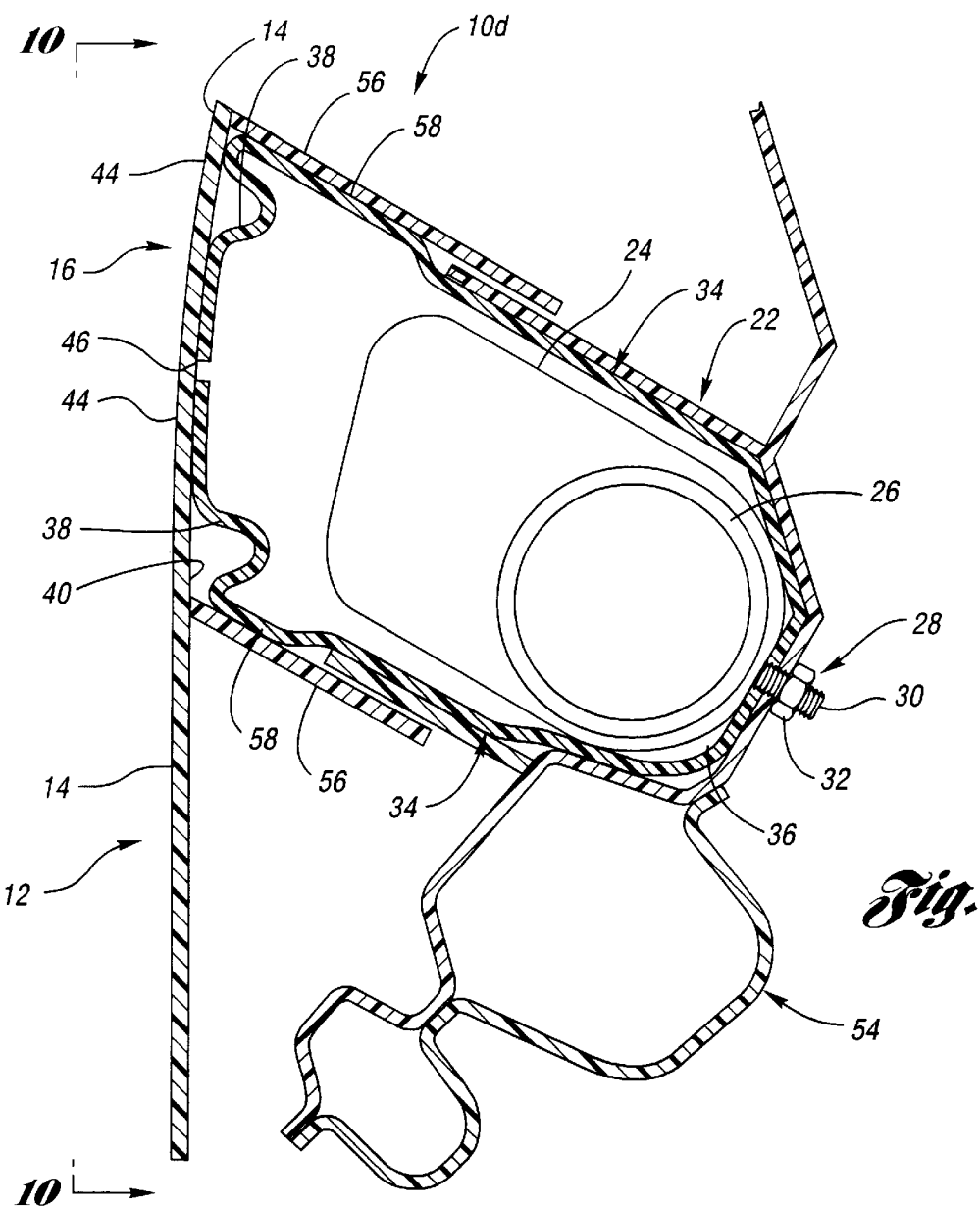
FIG. 9 is a view similar to FIG. 6 of a further embodiment whose breakaway door of the instrument panel includes a pair of door portions that break away upon air bag inflation.

With reference to FIGS. 1, 3, 6 and 9, different embodiments of a vehicle air bag restraint assembly are respectively identified by 10*a*, 10*b*, 10*c* and 10*d*. Each embodiment of the air bag restraint assembly includes a vehicle instrument panel 12 having a support portion 14 and a breakaway air bag door 16 mounted by the support portion. An air bag housing identified by 20 in FIGS. 1 and 3 and by 22 in FIGS. 6 and 9 is mounted adjacent the instrument panel 12 in a manner that is hereinafter more fully described. Each embodiment of the restraint assembly includes an air bag 24 mounted within the associated housing 20 or 22 and including an inflator 26 that has a threaded connection 28 to the housing as provided by a threaded stud 30 and a cooperable threaded nut 32.

With continuing reference to FIGS. 1, 3, 6 and 9, each embodiment of the restraint assembly 10a, 10b, 10c and 10d includes a flexible member 34 having a securement portion 36 that is secured to the associated housing 20 or 22 by the threaded connection 28 of the air bag inflator 26. The flexible member 34 also includes a tether portion 38 that extends to and is secured to the air bag door 16 of the instrument panel 12 to tether the air bag door when it breaks away from the support portion 14 of the instrument panel upon inflation of the air bag. The flexible member 34 may be a suitable thermoplastic urethane or thermoplastic polyester elastomer for providing the tethering of the breakaway air bag door 16. Vibration welding or a suitable adhesive may be utilized to secure the flexible member tether portion 38 to the associated air bag door 16.

Figure 1:
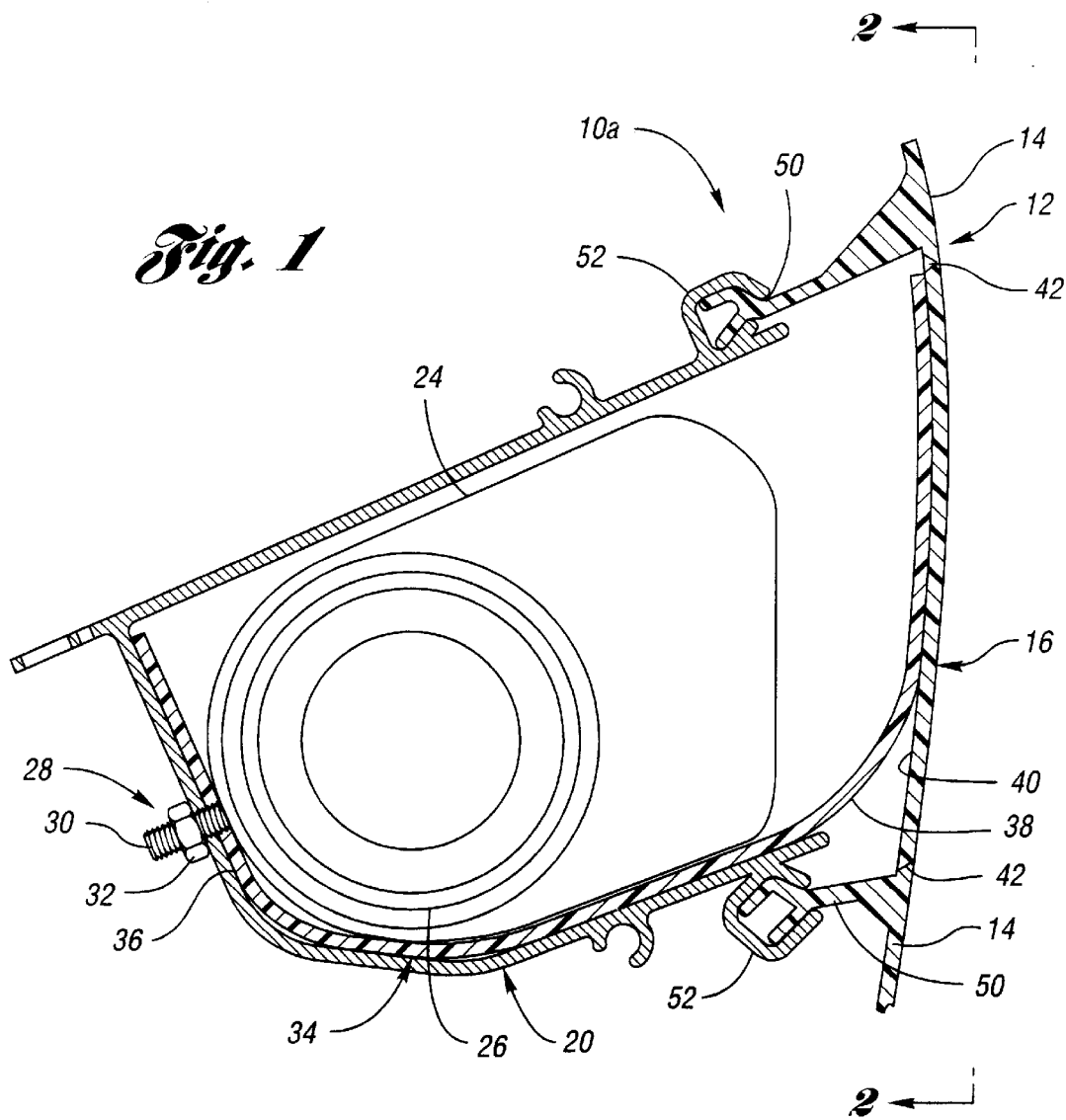
FIG. 1 is a sectional view taken through one embodiment of a vehicle air bag restraint assembly.
Figure 2:
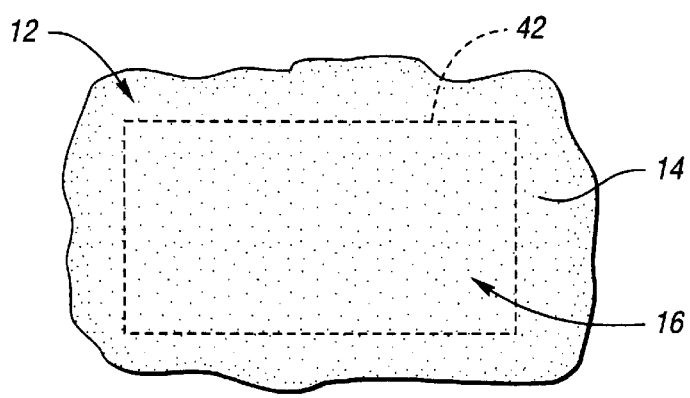
FIG. 2 is a view taken along the direction of line 2—2 in FIG. 1 to illustrate the rectangular shape of a breakaway door of a vehicle instrument panel of the restraint assembly.

In the embodiment of the air bag restraint assemblies 10a and 10c respectively shown in FIGS. 1 and 6, the instrument panel 12 has a hidden surface 40 including a breakaway line 42 that defines a rectangular shape as respectively shown in FIGS. 2 and 8. The breakaway rectangular door 16 is thus tethered by the tether portion 38 of the flexible member 34 when the air bag is inflated. This breakaway line 42 may be provided in any suitable manner such as by laser scoring, molding, etc.

Figure 10:
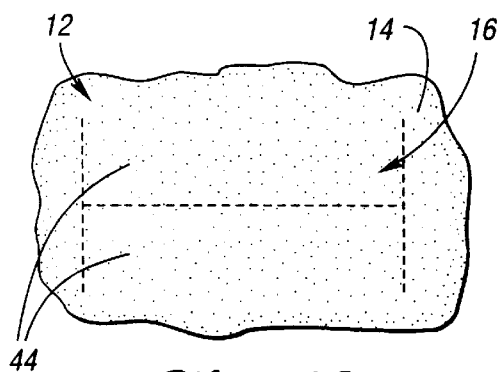
FIG. 10 is a view taken along the direction of line 10—10 in FIG. 9 to illustrate an H-shaped breakaway line that provides the pair of door portions on the instrument panel.
Figure 11:
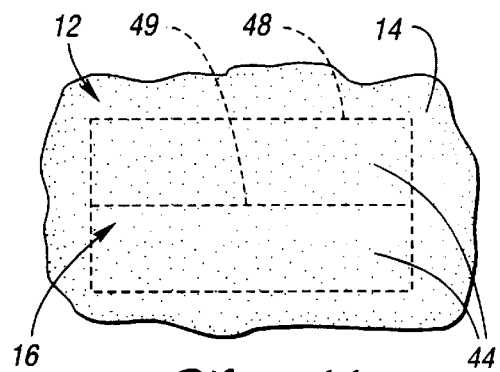
FIG. 11 is a view similar to FIG. 10 illustrating the breakaway line of the instrument panel as having a rectangular shape with a central dividing line that cooperatively provide the pair of door portions.

The embodiments of the restraint assembly 10b and 10d respectively illustrated in FIGS. 3 and 9 have their breakaway doors 16 of their instrument panels each provided with a pair of door portions 44. Furthermore, the flexible member 34 of these embodiments has a pair of the tether portions 38 that respectively extend to and are secured to the pair of door portions 44 of the door 16. The air bag 24 is located between the pair of tether portions 38. With the dual door portion construction of the instrument panel as shown in FIGS. 3 and 9, the instrument panel 12 may have its hidden surface 40 provided with a breakaway line 46 with an H-shaped configuration as respectively shown in FIGS. 4 and 10. It is also possible for the hidden surface 40 to have a breakaway line 48 of a rectangular shape with a central dividing line 49 that cooperatively define the pair of door portions 44 as shown in FIGS. 5 and 11. Furthermore, it is preferably for the pair of tether portions to be unitary with each other to reduce the number of components involved.

As illustrated in FIGS. 1 and 3, the embodiments of the restraint assembly 10a and 10b have the instrument panel 12 provided with fasteners 50 and the housing 20 is provided with fasteners 52. These fasteners 50 and 52 cooperate to provide mounting of the air bag housing 20 on the instrument panel. The housing 20 is shown in as being a metallic extrusion, such as from aluminum, but could also be constructed from fabricated sheet metal.

With reference to FIGS. 6 and 9, the embodiments of the restraint assembly 10c and 10d are each constructed in accordance with the invention and include a vehicle cross beam 54 that is mounted adjacent the associated instrument panel 12 and hidden from view from a vehicle occupant to the left of the instrument panel. The cross beam 54 extends laterally with respect to the vehicle and defines the air bag housing 22 in which the air bag 24 and its associated inflator 26 are mounted and secured by the associated connection 28 provided by the threaded stud 30 and associated nut 32. Furthermore, the instrument panel 12 included a housing extension 56 that extends to the air bag housing 22. The flexible member 34 includes an intermediate portion 58 that is secured to the housing extension 56 by vibration welding, a suitable adhesive or fasteners, etc.

In the embodiment of FIG. 6 which includes the single rectangular shaped door 16 there is also a connector 60 that extends from the connection 28 of the air bag inflator 26 to the instrument panel housing extension 56. Thus, in this embodiment, the flexible member 34 and the connector 60 cooperate to secure the cross beam housing 22 to the instrument panel. More specifically, the one end of the connector 60 is secured by the inflator connection 28, and the connector has another hooked end 62 that includes hooks 64 received by associated openings 66 in the housing extension 56.

In the dual door portion embodiment of the restraint assembly 10d shown in FIG. 9, the flexible member 34 has a pair of the intermediate portions 58 that are secured to the housing extension 56 of the instrument panel 12 adjacent the associated pair of tether portions 38. These intermediate portions 58 of the flexible member 34 cooperate to secure the cross beam housing 22 to the instrument panel housing extension 56 to secure the position of the air bag 26 with respect to the instrument panel.

While the best mode for carrying out the invention has been described in detail, those familiar with the art to which this invention relates will recognize various alternative designs and embodiments for practicing the invention as defined by the following claims.

What is claimed is:

1. A vehicle air bag restraint assembly, comprising:
a vehicle instrument panel having a support portion, a breakaway air bag door mounted by the support portion, and a housing extension;
a vehicle cross beam that includes an air bag housing to which the housing extension of the instrument panel extends;
an air bag mounted within the housing and including an inflator having a threaded connection to the housing; and
a flexible member having a securement portion that is secured to the housing by the threaded connection of the inflator, the flexible member including an intermediate portion that is secured to the housing extension of the instrument panel and the flexible member having a tether portion that extends to and is secured to the air bag door of the instrument panel to tether the air bag door when it breaks away from the support portion of the instrument panel upon inflation of the air bag.

2. A vehicle air bag restraint assembly as in claim 1 wherein the instrument panel has a hidden surface including a rectangular break line that defines the breakaway air bag door with a rectangular shape.

3. A vehicle air bag restraint assembly as in claim 1 wherein the breakaway air bag door includes a pair of door portions, the flexible member including a pair of intermediate portions that are secured to the housing extension of the instrument panel, the flexible member having a pair of tether portions that respectively extend to and are secured to the pair of door portions of the door, and the air bag being located between the pair of tether portions.

4. A vehicle air bag restraint assembly as in claim 3 wherein the pair of tether portions are unitary with each other.

5. A vehicle air bag restraint assembly as in claim 3 wherein the instrument panel has a hidden surface that includes a H-shaped break line that defines the pair of door portions.

6. A vehicle air bag restraint assembly as in claim 3 wherein the instrument panel has a hidden surface that includes a rectangular break line with a central dividing break line that cooperatively define the pair of door portions.

7. A vehicle air bag restraint assembly as in claim 1 wherein the vehicle instrument panel and the air bag housing have fastening portions that provide securement thereof to each other.

8. A vehicle air bag restraint assembly as in claim 1 further including a connector that extends between the housing extension of the instrument panel and the threaded connection of the air bag inflator to the housing of the cross beam.

9. A vehicle air bag restraint assembly as in claim 8 wherein the connector is embodied by a bracket having a hooked end connected to the housing extension of the instrument panel.

* * * * *